United States Patent [19]

Prock

[11] Patent Number: 5,674,118
[45] Date of Patent: Oct. 7, 1997

[54] ADAPTER SYSTEM FOR VEHICLE WINDSHIELD DEFROSTER

[76] Inventor: Charles W. Prock, 623 Johnson Dr., Duncanville, Tex. 75116

[21] Appl. No.: 642,847

[22] Filed: May 3, 1996

[51] Int. Cl.[6] .................................................. B60S 1/54
[52] U.S. Cl. ........................................ 454/127; 454/93
[58] Field of Search ........................... 454/85, 93, 124, 454/127, 198

[56] References Cited

U.S. PATENT DOCUMENTS

| | | |
|---|---|---|
| 1,057,087 | 3/1913 | Pitts . |
| 1,145,159 | 7/1915 | Marsh ........................ 454/85 |
| 1,201,862 | 10/1916 | Olson ........................ 454/85 |
| 1,448,508 | 3/1923 | Thum . |
| 1,574,400 | 2/1926 | McGraw . |
| 1,586,185 | 5/1926 | Don . |
| 1,628,814 | 5/1927 | Updegraff . |
| 1,630,921 | 5/1927 | Birely . |
| 1,918,387 | 7/1933 | Fantaci . |
| 2,124,925 | 7/1938 | McNeal . |
| 2,192,657 | 3/1940 | Werther ..................... 454/127 |
| 2,327,917 | 8/1943 | Marong ..................... 454/127 |
| 2,659,942 | 11/1953 | Iverson ..................... 454/127 |
| 3,331,940 | 7/1967 | Reid, Jr. ................. 454/127 X |
| 3,695,681 | 10/1972 | Dockery ................... 296/97 F |
| 5,001,966 | 3/1991 | McIntyre et al. . |
| 5,296,678 | 3/1994 | Schnorf .................... 219/203 |

*Primary Examiner*—Harold Joyce
*Attorney, Agent, or Firm*—Joseph N. Breaux

[57] ABSTRACT

An adapter system for vehicle windshield defroster including a manifold assembly including at least one manifold member having a defroster interface aperture formed through a bottom surface thereof that is surrounded on an outer bottom surface of the manifold member by a resilient gasket member secured to the outer bottom surface and a magnetic member secured to the gasket member, a manifold chamber formed within the manifold member in air flow communication with the defroster interface aperture, and at least one diffuser bar aperture that is in airflow communication with the manifold chamber; and at least one elongated diffuser bar having an airflow passageway formed along the length thereof, an air inlet aperture formed at a first end thereof in airflow communication with the airflow passageway, the first end of the diffuser bar being adapted to seat within the diffuser bar aperture in a manner to establish airflow between the airflow passageway and the manifold chamber, and a plurality of spaced diffuser apertures running along the length thereof in airflow communication with the airflow passageway.

10 Claims, 2 Drawing Sheets

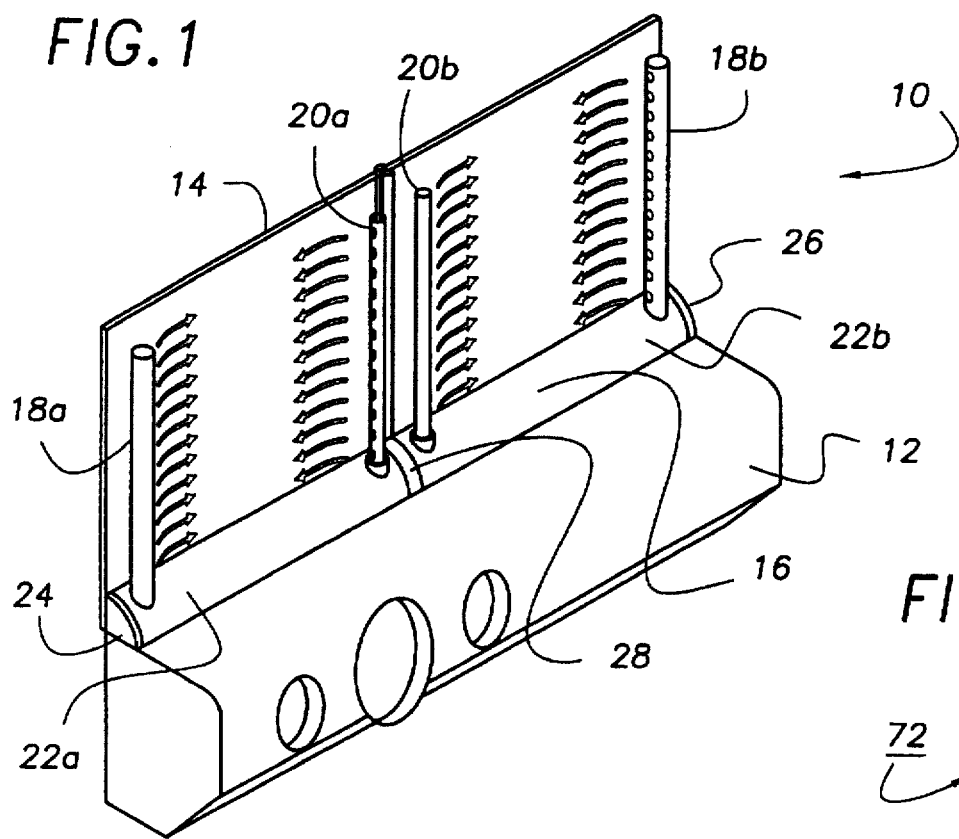
FIG. 1
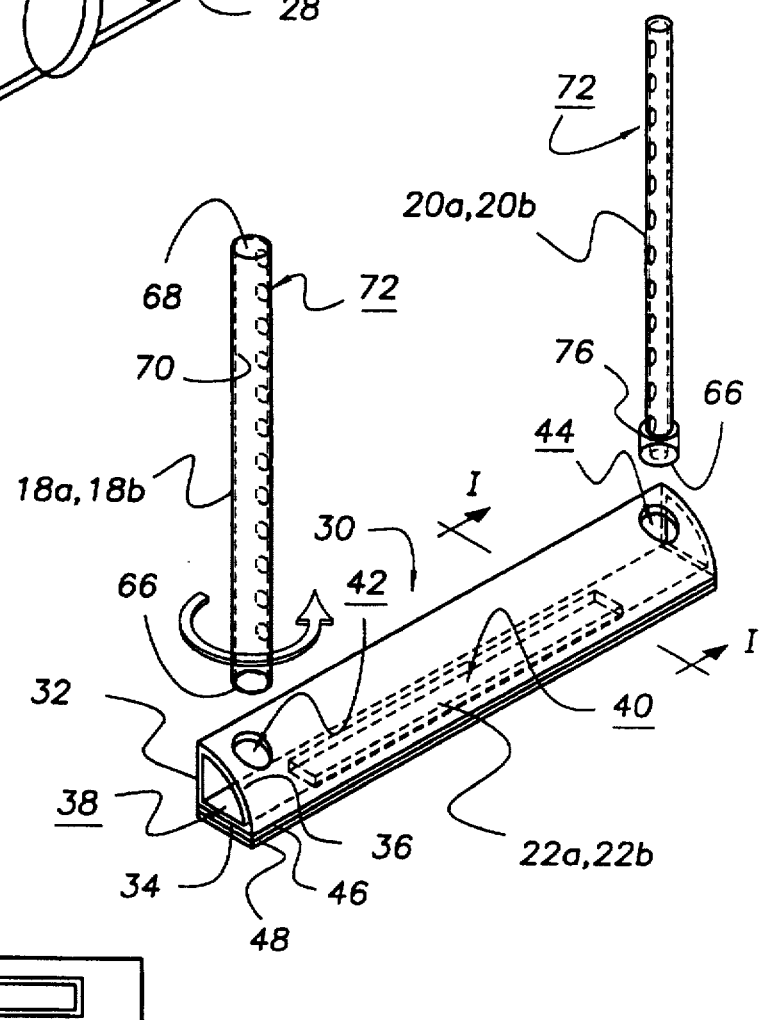
FIG. 2
FIG. 2a

ADAPTER SYSTEM FOR VEHICLE WINDSHIELD DEFROSTER

DESCRIPTION

1. Technical Field

The present invention relates to vehicle windshield defrosters and more particularly to a modular adapter system including a manifold assembly and at least one diffuser bar that is positionable over the existing defroster vents of a vehicle for directing the defroster air flow toward desired areas of the windshield of the vehicle.

2. Background Art

The windshields of large tractor trucks used to haul trailers are particularly susceptible of becoming covered with ice because of the relatively large area of windshield provided on these types of vehicles. The truck is generally provided with one or more defroster vents through the dashboard of the truck that direct the heated air from the defroster system toward the bottom of the truck windshield. Although this heated air flow is sufficient to maintain the bottom portion of the windshield near the defroster vent free of ice accumulation, the current defroster vent arrangement does little to prevent a large portion of the windshield from becoming dangerously covered with ice. It would be a benefit, therefore, to have an adaptor system that could be installed in connection with the existing defroster vent of the truck that allowed a driver to customize the direction of the defroster air flow toward the windshield to prevent ice accumulation over the entire windshield area. It would be a further benefit, if the adapter system was easily installed when needed and removed when not needed. It would also be a benefit, if the system were configurable in a variety of different configurations.

GENERAL SUMMARY DISCUSSION OF INVENTION

It is thus an object of the invention to provide an adapter system for vehicle windshield defroster that is installable in connection with the existing defroster vent of the truck to allow a driver to customize the direction of the defroster air flow toward the windshield.

It is a further object of the invention to provide an adapter system for vehicle windshield defroster that is easily installed when needed and removed when not needed.

It is a still further object of the invention to provide an adapter system for vehicle windshield defroster that is constructed of a number of interconnectable modules.

It is a still further object of the invention to provide an adapter system for vehicle windshield defroster that all or some of the above objects in combination.

Accordingly, an adaptor system for vehicle windshield defroster is provided. The adaptor system comprises a manifold assembly including at least one manifold member having a defroster interface aperture formed through a bottom surface thereof that is surrounded on an outer bottom surface of the manifold member by a resilient gasket member secured to the outer bottom surface and a magnetic member secured to the gasket member, a manifold chamber formed within the manifold member in air flow communication with the defroster interface aperture; and at least one diffuser bar aperture that is in airflow communication with the manifold chamber; and at least one elongated diffuser bar having an airflow passageway formed along the length thereof, an air inlet aperture formed at a first end thereof in airflow communication with the airflow passageway, the first end of the diffuser bar being adapted to seat within the diffuser bar aperture in a manner to establish airflow between the airflow passageway and the manifold chamber, and a plurality of spaced diffuser apertures running along the length thereof in airflow communication with the airflow passageway.

In use, the defroster interface aperture is placed over an existing defroster vent formed through the dashboard of the vehicle and sealingly held in place by the magnetic member in a manner such that air flow from the existing defroster vent is directed through the manifold chamber, the air passageway and out toward the windshield through the plurality of diffuser apertures. The diffuser bar is then adjusted by the user until the desired air flow pattern is achieved. In a preferred embodiment, the adapter system includes at least one manifold member, open at both ends and including a defroster interface aperture and a diffuser aperture; two end cap members adapted to seal the ends of the manifold member; a manifold member connecting fitting for connecting one manifold member to another manifold member in a manner to establish airflow connection therebetween; and at least one diffuser bar.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 is a perspective view of an exemplary embodiment of the adapter system for vehicle windshield defroster of the present invention in use on the representative dashboard of a tractor truck showing the defroster manifold assembly constructed from two manifold members attached to the dash board and two edge diffuser bars and two center diffuser bars connected to the defroster manifold members.

FIG. 2 is a perspective view of an exemplary manifold member showing the defroster interface aperture, the gasket member, the magnet member, and two diffuser apertures.

FIG. 2A is a plan view of the underside of the exemplary manifold member of FIG. 2 showing the defroster interface aperture.

EXEMPLARY MODE FOR CARRYING OUT THE INVENTION

Figure 3:
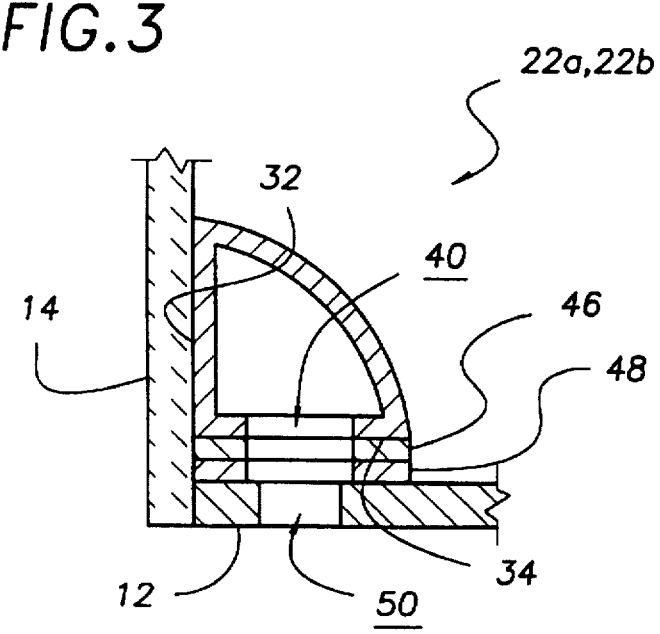
FIG. 3 is a cross sectional view of the manifold member of FIG. 2 along the line I—I atop a representative dash board and adjacent to a representative windshield showing the defroster interface aperture, the gasket member, and the magnet member.

FIG. 1 shows an exemplary embodiment of the adaptor system for vehicle windshield defroster, generally designated by the numeral 10, in use with a representative truck dashboard 12 and truck windshield 14. Exemplary adaptor system 10 includes a manifold assembly, generally designated by the numeral 16; two edge diffuser bars 18a,18b; and two center diffuser bars 20a,20b. Manifold assembly 16 includes two manifold members 22a,22b; a first end cap 24, a second end cap 26, and a manifold member connecting fitting 28. In this embodiment, manifold members 22a,22b are identical.

As shown in FIG. 2, manifold members 22a,22b include an outer housing 30 about thirty-three inches in length that is molded from plastic and has two substantially planar sides 32,34 and a concave side 36. A manifold chamber 38 is formed within outer housing 30 that is in airflow connection with a defroster interface aperture 40 (shown in dashed lines) that is formed through side 34; a first diffuser bar aperture 42; and a second diffuser bar aperture 44. In this embodiment, first and second diffuser bar apertures are identical in size, are circular, and are formed through concave side 36. Manifold members 22a,22b each include a resilient plastic gasket member 46 that is adhesively secured to the outwardly facing surface of planar side 34, and a magnetic member 48 that is adhesively secured to gasket member 46. Magnetic member 48 is formed from a flexible plastic impregnated with magnetized particles.

FIG. 2A more clearly shows defroster interface aperture 40 surrounded by magnetic member 48. With reference to FIG. 3, gasket member 46 is sandwiched between magnetic member 48 and side 34 of manifold member 22a,22b. In use, defroster interface aperture 40 is positioned over a defroster vent 50 that is formed through representative truck dash 12 and side 32 is positioned against the windshield 14. Magnetic member 48 is magnetically attracted to steel material beneath dash 12 and holds manifold member 22a,22b securely in place preventing air from flowing between magnetic member 48 and dash 12. Use of resilient gasket member 46 and flexible magnetic member 48 allows for enhanced sealing between dash 12 and manifold member 22a,22b.

Figure 5:
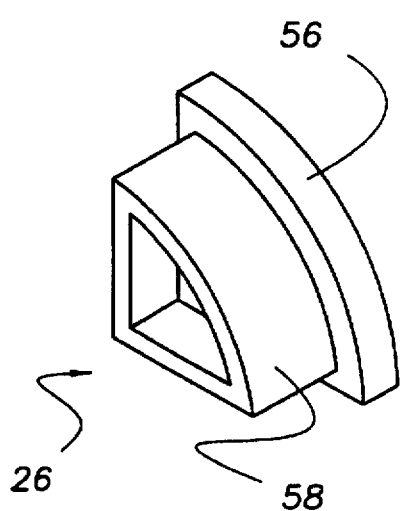
FIG. 5 is a perspective view of the exemplary end cap of FIG. 4 showing a portion of the insertion portion and the cap portion.
Figure 4:
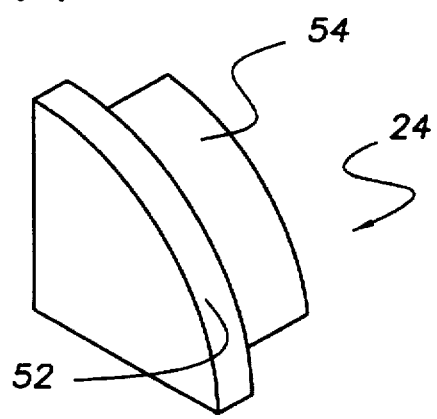
FIG. 4 is a perspective view of an exemplary end cap showing the insertion portion and an edge of the cap portion.

FIG. 4 shows first end cap 24. First end cap 24 is molded from plastic and includes a cap portion 52 and an insertion portion 54 that is inserted into the open end of manifold member 22a,22b. FIG. 5 shows second end cap 26. Second end cap 24 is molded from plastic and includes a cap portion 56 and an insertion portion 58. In this embodiment, first and second end caps 24,26 are identical.

Figure 6:
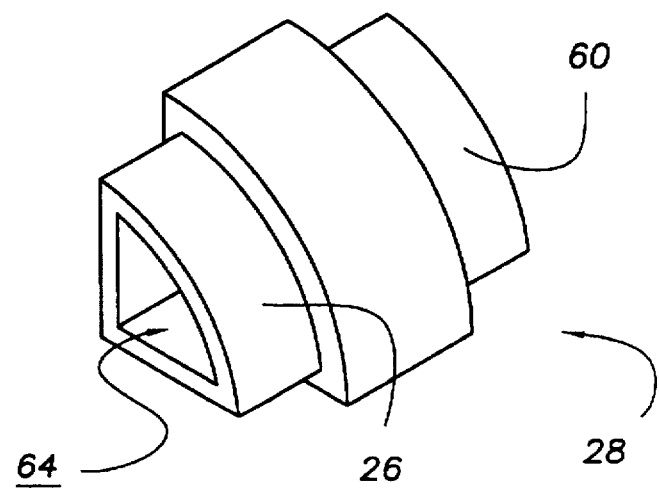
FIG. 6 is a perspective view of the manifold member connecting fitting.

FIG. 6 shows an exemplary manifold member connecting fitting 28. Connector fitting 28 is used to connect manifold member 22a to manifold member 22b in a manner to establish airflow connection between the two. Connector fitting includes first and second insertion portions 60,62 that are inserted respectively into an open end of manifold members 22a,22b. A connecting passageway 64 is provided between insertion portions 60,62 to establish an airflow path between manifold members 22a,22b when connected by connector fitting 28.

With reference once again to FIG. 2, one of the two edge diffuser bars 18a,18b; and one of the two center diffuser bars 20a,20b are shown. Edge diffuser bars 18a,18b are about twenty inch lengths of circular cross section, two inch outer diameter, plastic tubing having an open end 66, a sealed end 68, and an airflow passageway 70 (shown in dashed lines) formed along the length thereof. Twelve diffuser apertures 72, formed through the side of edge diffuser bars 18a,18b, are spaced along the length thereof and are in connection with airflow passageway 70. Open end 66 is inserted into and frictionally held in connection with first diffuser bar aperture 42. Once open end 66 is inserted into first diffuser bar aperture 42, edge diffuser bar 18a, 18b can be rotated to direct airflow from diffuser apertures 72 to the desired area of windshield 14.

Center diffuser bars 20a,20b are substantially identical in construction to edge diffuser bars 18a,18b except the outer diameter of center diffuser bars 20a,20b is about one and one-quarter inch and an adapter ring 76 having an outer diameter of two inches is placed around open end 66 to allow center diffuser bars 20a,20b to be inserted and sealing held within second diffuser bar aperture 44.

In use, manifold members 22a,22b are connected with connector fitting 28 as previously described and end caps 24,26 inserted into the open ends thereof. The two edge diffuser bars 18a,18b and the two center diffuser bars are then connected to manifold members 22a,22b as previously described. Each defroster interface aperture 40 is placed over an existing defroster vent 50 and sealingly held in place by magnetic member 48. Diffuser bars 18a,18b,20a,20b are then rotated by the user until the desired air flow pattern against windshield 14 is achieved.

It can be seen from the preceding description that an adapter system for vehicle windshield defroster has been provided that is installable in connection with the existing defroster vent of a vehicle in a manner to allow a driver to customize the direction of defroster air flow toward the windshield; that is easily installed when needed and removed when not needed; and that is constructed of a number of interconnectable modules.

It is noted that the embodiment of the adapter system for vehicle windshield defroster described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An adapter system for vehicle windshield defroster comprising:

a manifold assembly including at least one manifold member having a defroster interface aperture formed through a bottom surface thereof that is surrounded on an outer bottom surface of said manifold member by a resilient gasket member secured to said outer bottom surface and a magnetic member secured to said gasket member, a manifold chamber formed within said manifold member in air flow communication with said defroster interface aperture, and at least one diffuser bar aperture that is in airflow communication with said manifold chamber; and at least one elongated diffuser bar having an airflow passageway formed along the length thereof, an air inlet aperture formed at a first end thereof in airflow communication with said airflow passageway, said first end of said diffuser bar being adapted to seat within said diffuser bar aperture in a manner to establish airflow between said airflow passageway and said manifold chamber, and a plurality of spaced diffuser apertures running along said length thereof and in airflow communication with said airflow passageway.

2. The adapter system for vehicle windshield defroster of claim 1, wherein:

said manifold assembly includes two said manifold members each being open at both ends;

two end cap members adapted to seal one said open ends of each said manifold member; and a manifold member connecting fitting for connecting the other open end of each two manifold members to said other in a manner to establish airflow connection therebetween.

3. The adapter system for vehicle windshield defroster of claim 1, wherein:

said at least one diffuser bar is a circular cross section tube closed at one end thereof.

4. The adapter system for vehicle windshield defroster of claim 1 wherein:

said manifold member includes an outer housing having two substantially planar sides and a concave side.

5. The adapter system for vehicle windshield defroster of claim 4 wherein:

said first diffuser bar aperture is formed through said concave side.

6. The adapter system for vehicle windshield defroster of claim 3, wherein:

said manifold assembly includes two said manifold members each being open at both ends;

two end cap members adapted to seal one said open ends of each said manifold member; and a manifold member connecting fitting for connecting the other open end of each two manifold members to said other in a manner to establish airflow connection therebetween.

7. The adapter system for vehicle windshield defroster of claim 3 wherein:

said manifold member includes an outer housing having two substantially planar sides and a concave side.

8. The adapter system for vehicle windshield defroster of claim 7 wherein:

said first diffuser bar aperture is formed through said concave side.

9. The adapter system for vehicle windshield defroster of claim 7, wherein:

said manifold assembly includes two said manifold members each being open at both ends;

two end cap members adapted to seal one said open ends of each said manifold member; and a manifold member connecting fitting for connecting the other open end of each two manifold members to said other in a manner to establish airflow connection therebetween.

10. The adapter system for vehicle windshield defroster of claim 9 wherein:

said first diffuser bar aperture is formed through said concave side.

\* \* \* \* \*